Patented May 4, 1943

2,318,034

UNITED STATES PATENT OFFICE 2,318,034

EMULSION BREAKING COMPOUND

Truman B. Wayne, Houston, Tex.

No Drawing. Application July 6, 1937,
Serial No. 152,277

26 Claims. (Cl. 252—342)

This invention relates to a process of resolving petroleum emulsions of the character commonly encountered in the production, handling and refining of petroleum.

The principal object of this invention is to provide an improved process and reagents for treating petroleum emulsions to separate them into their component parts of oil and water.

Another object is to provide a novel product or reagent which is water-wettable, interfacial, and surface-active in order to enable its employment as a demulsifier or for such uses where water-wettable properties and characteristics are necessary or desirable.

Further objects will appear from the following in which the reagents and the process for their employment will be described as related to their employment for the treating of petroleum emulsions.

The present process comprises subjecting a petroleum emulsion of the water and oil type to the action of small proportions of a complex organic condensation product of high molecular weight, resembling somewhat the synthetic resins produced by the condensation of two or more organic bodies containing resinophore groups but differing from the conventional synthetic resins or modified synthetic resins in that they have been rendered suitable for petroleum dehydration through structural modification which imparts to them the characteristics or properties necessary for this purpose.

The new demulsifying agents herein disclosed for use in my present process may be generally described as chemical compounds characterized by the presence of a body obtained by reacting a chemical compound containing the grouping

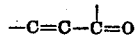

with one or more equivalents of a chemical compound containing unsaturated linkages; however, the compounds are water-wettable, interfacial and surface-active. The preferred reagent is prepared by reacting a substance containing the αβ-enal grouping

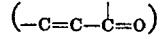

with one or more equivalents of a compound having a system of conjugated double bonds, and subsequently reacting the product of the above Diels-Alder reaction with one or more molecules of a third class of chemical compounds containing resinophore groups which are reactive with the resinophore groups present on the adduct from the Diels-Alder reaction. The latter reaction preferably is conducted in the presence of a fourth class of chemical substances which acts as a modifying agent and permits the preparation of a liquid, oily, resin possessing sufficient water and/or oil solubility to perform its function as an emulsion breaking and resolving agent. This latter substance may perform its function mechanically by simple admixture, or, preferably, through chemical reaction with the resin body in such manner that a modifying group or groups is introduced into the resin molecule which prevents the formation of insoluble, infusible, water-repellent resins such as are ordinarily made and used in the plastics industries, but produces a water-wettable, interfacial and surface-active reagent.

The above generic description of my new reagents which are used in my improved demulsifying process will be made entirely clear by the following description of the various materials falling under the four general classes of substances hereinabove set forth.

The first essential class of substances, i. e., those containing the αβ-enal grouping, must necessarily always be used as the primary starting material for the synthesis of my improved demulsifiers. It is possible in some instances to eliminate one or more of the three remaining separate classes of substances used in these reactions because certain chemical bodies possess more than one functional property which causes them to fit into more than one classification. However, whether or not four separate substances must be used to fulfill the four functional properties required, the following conditions must be met:

1. The presence of a chemical substance containing the αβ-enal grouping

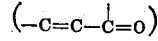

or similar analogous reactive group or body providing this grouping. Among suitable substances providing this grouping are maleic acid, fumaric acid, itaconic acid, citraconic acid, cinnamic acid, arylic acid, and their corresponding anhydrides; aldehydes such as acrolein and crotonaldehyde, and quinones such as benzoquinone and napthoquinone. This classification includes both straight chain and ring compounds.

2. The presence of a substance capable of forming addition products with substances possessing the functional αβ-enal grouping. Among suitable substances are those having a system of conjugated double bonds; (a) compounds having straight chains, such as butadiene, isoprene, dimethyl-butadiene, drying oils such as tung oil and oxy-octadecadienoic acid and similar substances derived by processing fatty materials; (b) cyclic compounds such as cyclopentadiene, cyclohexadiene, anthracene, acyclic and cyclic terpenoids such as myrcene and α-phellandrene, respectively, wood rosin, abietic acid and its esters, and cyclic unsaturated bodies produced by polymerization of castor oil, heterocyclic oxygen or nitrogen compounds, etc.; and (c) certain substances such as cyclopentadienone which possess both the αβ-enal grouping and conjugated double bonds. Certain other substances not possessing conjugated double bonds, but otherwise of unsaturated nature such as certain azo compounds, olefins, diolefins, terpenes, etc.

3. The presence of a substance containing a resinophore group or groups capable of reacting with the resinophore functions of the adduct prepared from substances undergoing the Diels-Alder reaction. If, for instance, the adduct is prepared from maleic anhydride and cyclopentadiene, the anhydride radical remains intact and will react with hydroxy compounds such as glycerol, glycols, hydroxy fatty acids, and esters such as castor oil, etc. If the adduct is prepared from substances which provide an aldehydic function, it may be reacted with aromatic hydroxy bodies such as phenols, or with ketones, amines, and other aldehyde-reactive substances.

4. The presence of a modifying substance, group, or groups which prevent the formation of hard, insoluble, infusible, water-repellent resins when the third step described above is performed. This substance may be present in mechanical admixture as an interfering substance to prevent the resinifying reactions from proceeding to the final stage, or may exert a solvent effect on the resin bodies. Preferably it should react with the resin to introduce modifying groups. Substances in this classification may perform both functions 3 and 4, as in the case of hydroxy fatty acids and their corresponding esters. For instance, castor oil is a hydroxylated body containing three hydroxyl groups per mol, and also provides the necessary long chain aliphatic residues which are among the general group of substances suitable as modifying substances. An equivalent of castor oil would be three moles of the half oleic acid ester of diethylene glycol. The free hydroxyl group of each mol of ester could react with one residual carboxyl on the adduct prepared by the Diels-Alder synthesis, and thus provide both the resinophore and modifying groups.

Where the adduct from the Diels-Alder reaction contains a reactive aldehydic function, and is reacted with suitable aldehyde-reactive substances, the modifying group may likewise perform its function in substantially mechanical form, but this function is also best performed where the reactive resinoid body combines chemically with the modifying agent. As is readily apparent to those skilled in organic synthesis, the modifying substance may react through the agency of reactive carboxyl, hydroxyl, carbonyl, halogen, sulfo, or other groups attached to the modifying molecule or molecules.

It is also obvious that it will not always be necessary to conduct this synthesis in successive steps, as may be erroneously inferred by some after reading the above description of the necessary functional requirements. One may prepare suitable products by mixing the various chemical bodies necessary for satisfying the four functional requirements, and heating the mixture at elevated temperatures at atmospheric or higher pressures, preferably, though not necessarily, in the presence of suitable catalysts. The reactive functions of the various groupings will proceed along the same general lines as though the diene adduct were first prepared and later reacted with the resinophore and modifying substances. For instance a mixture of one mol of maleic anhydride, one mol of cyclohexadiene or coumarone, one mol of glycerol and one mol of oleic acid will yield a product substantially the same as that obtained by carrying out the reactions in successive steps.

Added steps such as sulfonation, chlorination, alkylation, amination, acylation, or polymerization may be performed without departing from the spirit of the disclosures and claims of this invention. These may be performed either on the intermediate chemical bodies or the final modified resinoid.

It is readily apparent that the Diels-Alder synthesis, when used with the subsequent resinifying and modifying steps, provides a very wide range of chemical compounds which may be suitable for my purpose. Obviously, I have not investigated all possible combinations of the many chemical bodies possessing the necessary functional properties for syntheses of this nature, nor the properties of every possible modified resinoid which may be prepared from these disclosures and found suitable for my purpose. Obviously, these are matters for continued experimentation, the results of which may readily be tested for demulsifying properties on typical oil-field emulsions obtained from one or more oil-producing areas. These demulsification tests on such emulsions, using the products prepared according to the principles herein disclosed, are well known and understood not only by skilled organic chemists engaged in the preparation of such products, but also by practical oil treaters. My broad idea contemplates all suitable products possessing demulsifying properties as determined by these demulsification tests, prepared according to the principles herein disclosed and characterized by the presence of one or more residues from chemical bodies containing the αβ-enal grouping

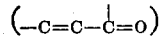

which has been additively combined with one or more residues from unsaturated reactive substances of the type herein described, and further characterized by chemical combination between the reactive groups of the diene adducts and reactive resinophore bodies.

The following procedures for the synthesis of suitable demulsifiers are given as illustrations of my invention, but I do not limit myself to the specific chemicals, proportions, procedures, or preparations disclosed. These may be widely varied and still fall within the disclosures contained herein and as defined in the appended claims.

*Example 1*

An efficient demulsifier may be prepared by reacting a mixture of two moles of maleic anhydride, approximately four moles of the unsaturated constituents of a special coal-tar fraction boiling between 160°–200° centigrade, and two moles of castor oil (triricinolein). 198 pounds of technical maleic anhydride, 1200 pounds of a special fraction of solvent naphtha containing 40% unsaturated resin-forming bodies (coumarone, indene, cyclopentadiene, and similar substances whose average molecular weight has been taken as 118, the molecular weight of coumarone), and 1872 pounds of castor oil are mixed and heated at 125° C. for four hours and finally at 180° C. for an additional four hours. The viscous, oily resin of fluorescent green color prepared by this procedure is a suitable demulsifier without additional treatment, or may be partially saponified with a base to increase its solubility in water.

*Example 2*

600 pounds of the oily resin obtained from Example 1 is cautiously sulfonated at 30°–40° centigrade with 300 pounds of 20% oleum and then warmed to 50°–60° C. and maintained for from one to four hours at this temperature, depending on the degree of sulfonation desired. The sulfonated mixture of product and free acid is then slowly run into a vessel equipped with cooling coils which contains about 600 pounds of cold water. The mixture is agitated to wash thoroughly, is allowed to stratify, the wash water containing the free acid is withdrawn, and the sulfonated resin is carefully neutralized with an alkali, ammonia, or an amine, or may be converted to an amide of an oil soluble amine such as monoamylamine, cyclohexylamine, etc., by prolonged heating at elevated temperatures in the presence of a solvent such as xylene, solvent naphtha, petroleum distillates, etc., which carries out the water formed during the reaction.

*Example 3*

Suitable demulsifiers may also be prepared from non-carboxy substances and unsaturates according to the same general scheme. This may be accomplished by heating 185 pounds of glycerol under reflux at 200°–230° C. in the presence of 10 pounds of potassium hydrogen sulfate and 1 pound of 98% sulfuric acid. In order to prevent polymerization of the acrolein as formed, 570 pounds of oleic acid is added preferably at this stage. After substantially all of the glycerol has been converted to acrolein, 1200 pounds of the special fraction of solvent naphtha described in Example 1, which contains coumarone, indene, cyclopentadiene, and similar unsaturated substances, is added and the reaction is continued by boiling the mixture vigorously for 2 hours. 165 pounds of para-tertiary amyl phenol (Sharples) is added to the crude diene addition product and the heating is continued at the boiling point of the solvent naphtha (160°–200° C.) until an oily resin of the consistency of blown castor oil is produced.

Under the conditions above described the first reaction is between the acrolein (formed from glycerol) and the unsaturated compounds in the naphtha, to form the addition product. The oleic acid may react to some extent with the glycerol or the acrolein but its primary function is to keep the resin product in a liquid state throughout the reactions. The para-tertiary amyl phenol then reacts with the aldehydic function of the adduct, and the oleic acid probably reacts with the reactive resin so formed.

The product may be freed from the potassium hydrogen sulfate and acid by washing with 20° Bé. sodium chloride solution and is then preferably, though not necessarily, sulfonated before use as a demulsifier.

*Example 4*

150 pounds of a crude fraction of diterpene boiling between 170°–180° C. derived from the fractionation of crude turpentine, 98 pounds of maleic anhydride, and 200 pounds of tung oil are heated at 250°–280° C. for four hours. The product is a clear viscous oil at high temperatures. 936 pounds of castor oil is then added and the reaction is continued at 200°–250° C. for an additional four hours to obtain an oily resin whose acid number is practically nil. This reaction may also be conducted in the presence of approximately 10 pounds of dibutylnaphthalene sulfonic acid as a catalyst.

The resin is diluted with an equal volume of a 50–50 mixture of solvent naphtha and 99% isopropyl alcohol. It may be used in this form or may be partially saponified with an alkali, ammonia, or amine; or may be sulfonated before neutralizing as above described.

The product prepared as above described is a complex adduct or mixture of adducts prepared from dipentene and the unsaturated tung acids, whose acidic carboxy functions are subsequently esterified by the alcoholic function of the castor oil. The fatty residues from the tung oil and castor oil molecules are the modifying agents.

While the invention as described in the above specific examples has been confined to maleic anhydride diene adducts to illustrate the reactions of adducts possessing acid functional groups on one hand, and acrolein diene adducts on the other, it should be understood that these types of syntheses render a wide range of compositions available. The unsaturated substances may be pure compounds or crude fractions containing mixtures of various substances and/or various isomers of the same chemical compound, such as may be found in various coal tar distillates, fractions of unsaturates obtained from the cracking of petroleum distillates, fractions from wood distillation, etc. Likewise, although castor oil has been used as an example of substances providing carboxyl-reactive groups, other substances selected from the large group of resinophore substances capable of reacting with the acidic diene adduct may be used. Glycols, hydroxy-amines, and other hydroxy bodies are equivalents of castor oil, especially where a fatty body is used as a modifying agent. Other carboxyl-reactive substances such as amines, amides, etc., are also contemplated.

An alkyl phenol has been illustrated as an aldehyde-reactive substance suitable for reaction with the aldehydic function of the acrolein adduct. Other acid aromatic bodies possessing the resinophore function are also contemplated. Amines, amides, aminophenols, aromatic sulfonamides, hydrogenated naphthalenes, ketones, ketenes, substituted ureas, polyvinyl compounds, and various derivatives of these substances belong to this class of substances.

Castor oil and oleic acid have been disclosed as modifying agents. Fatty acids and fatty esters, generally, are suitable modifying agents although the saturated higher fatty acids such as stearic acid and its esters are not as advantageous because of their high solidification points. Amides of fatty acids are suitable modifying agents, as are higher alcohols such as oleyl alcohol, certain liquid polyolefins, reactive cyclo-paraffins and naphthenes. The essential characteristics of these modifying substances seem to depend on alkyl or cycloalkyl chains or rings of considerable magnitude which impart fluidity and solubility to the resin bodies.

The necessary polar properties of my new demulsifiers are doubtless imparted by carboxyl, hydroxyl, ester, and similar groups in the molecule. This property may be enhanced when desired by sulfonation, amination, and other steps which impart polar properties to a substance that is preponderantly of hydrophobic nature.

My improved demulsifiers may be used alone or after dilution with suitable organic solvents. Some of my saponified and/or sulfonated demulsifiers are sufficiently soluble in water to allow the preparation of aqueous solutions of convenient concentration. The solubility of the more insoluble types may be increased by mixing them in aqueous suspension with well known water soluble demulsifiers such as soaps, sulfonated fatty and aromatic products, etc. This is well understood by those in charge of treating operations, and no invention is involved in preparing these various mixtures.

The term "water-wettable" as used in the specification and claims refers to the characteristic of the product which enables it to be readily wetted by water and which is usually accompanied by some degree of hydration of the product in contact with the aqueous phase of the emulsion. When the product segregates at the interface of the emulsion and is adsorbed at the interfacial film where the hydrophobe body responsible for the emulsion exists, the water-wettable property of this product counteracts the effect of the hydrophobe present in the emulsion and thus effects its resolution.

The term "water-soluble" is used to include the property of forming colloidally hydrated aqueous solution. From the following paragraph it will be seen that only a limited degree of actual "water solubility" is necessary for the reagents used for breaking petroleum emulsions, for the reason that extremely small proportions of the reagents are ordinarily used.

The term "oil soluble" is used to include the property of colloidal dispersion in the oil phase.

The demulsifier is added to the petroleum emulsion in proportions ranging between 1 part of demulsifying chemical to from 1,000 to 50,000 parts of emulsion, depending on the nature of the emulsion and its relative resistance to the action of the treating chemical. It is conceivable that as much as one part per 1,000 parts of emulsion may be necessary to the treatment of very refractory tank bottoms containing very stubborn emulsions, whereas one part to 50,000 parts of emulsion, or even less, will suffice for the treatment of many emulsions of limited stability.

The demulsifier may be added to the emulsion in any of the numerous methods used in oil-field practice, and the treating operation may be conducted in any suitable apparatus ordinarily available in petroleum producing areas, or which may be readily adapted to my process.

I claim:

1. In the process of breaking and resolving petroleum emulsions, the step of adding thereto a water-wettable, interfacial and surface-active reagent characterized by the presence of an addition product of a substance containing the αβ-enal grouping

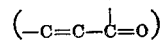

and an unsaturated chemical body.

2. In the process of breaking and resolving petroleum emulsions, the step of adding thereto a water-wettable, interfacial and surface-active reagent of the modified synthetic resin type comprising a modified synthetic resin of the type herein described, and characterized by the presence of a resinoid substance containing the reaction product of a substance containing the αβ-enal grouping

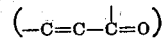

an unsaturated chemical body capable of forming an addition product with said substance, and a chemical body containing resinophore groups capable of reacting with the reactive functional groups of said addition product.

3. In the process of breaking and resolving petroleum emulsions, the step of adding thereto a water-wettable, interfacial and surface-active reagent of the modified synthetic resin type comprising a modified synthetic resin of the type herein described, and characterized by the presence of a resinoid substance containing the reaction product of a substance containing the αβ-enal grouping

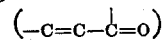

an unsaturated chemical body capable of forming an addition product with said substance, a chemical body containing resinophore groups capable of reacting with the reactive functional groups of said addition product, and a modifying agent characterized by its property of suitably modifying the properties of said resinoid.

4. In the process of breaking and resolving petroleum emulsions, the step of adding thereto a water-wettable, interfacial and surface-active reagent of the modified synthetic resin type comprising a modified synthetic resin of the type herein described, and characterized by the presence of an addition product of a substance containing the αβ-enal grouping

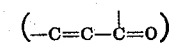

and an unsaturated chemical body having a system of conjugated double bonds.

5. In the process of breaking and resolving petroleum emulsions, the step of adding thereto a water-wettable, interfacial and surface-active reagent of the modified synthetic resin type comprising a modified synthetic resin of the type herein described, and characterized by the presence of a resinoid substance containing the reaction product of a substance containing the αβ-enal grouping

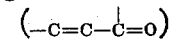

and an unsaturated chemical body having a system of conjugated double bonds and characterized by its property of forming addition products with substances containing the αβ-enal grouping

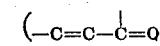

and a chemical body containing resinophore groups capable of reacting with the reactive functional groups of said addition product, and a modifying agent characterized by its property of suitably modifying the properties of said resinoid.

6. The process step as claimed in claim 1, wherein the αβ-enal grouping

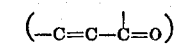

is derived from a carboxy compound.

7. The process step as claimed in claim 1, wherein the αβ-enal grouping

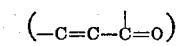

is derived from an aldehyde.

8. The process step as claimed in claim 1, wherein the αβ-enal grouping

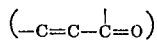

is derived from a quinone.

9. The process step as claimed in claim 3, wherein the αβ-enal grouping

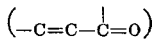

is derived from an aldehyde.

10. The process step as claimed in claim 3, wherein the αβ-enal grouping

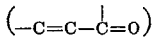

is derived from a quinone.

11. A petroleum emulsion breaking and resolving composition which comprises as a component part a water wettable, interfacial and surface-active reagent characterized by the presence of an addition product of a substance containing the αβ-enal grouping

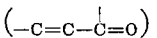

and an unsaturated chemical body.

12. A petroleum emulsion breaking and resolving composition which comprises as a component part a water-wettable, interfacial and surface-active reagent of the modified synthetic resin type, and characterized by the presence of an addition product of a substance containing the αβ-enal grouping

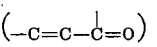

and an unsaturated chemical body.

13. A petroleum emulsion breaking and resolving composition which comprises as a component part a water-wettable, interfacial and surface-active reagent characterized by the presence of an addition product of a substance containing the αβ-enal grouping

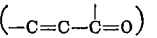

and an unsaturated chemical body having a system of conjugated double bonds.

14. A petroleum emulsion breaking and resolving composition which comprises as a component part a water-wettable, interfacial and surface-active reagent of the modified synthetic resin type, and characterized by the presence of a resinoid substance containing the reaction product of a substance containing the αβ-enal grouping

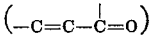

and an unsaturated chemical body having a system of conjugated double bonds and characterized by its property of forming addition products with substances containing the αβ-enal grouping

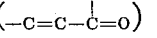

and a chemical body containing resinophore groups capable of reacting with the reactive functional groups of said addition product.

15. The process of producing a compound of the character described comprising, reacting a substance containing the αβ-enal grouping

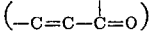

with a reactive unsaturated body capable of forming an addition product therewith and reacting said adduct with a chemical body containing resinophore groups, in the presence of a modifying agent resulting in the production of a water-wettable interfacial and surface-active compound.

16. A water-wettable, interfacial and surface-active reagent comprising an incompletely resinified compound characterized by the presence of an addition product of a substance containing the αβ-enal grouping

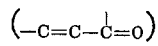

and an unsaturated chemical body.

17. A water-wettable, interfacial and surface-active reagent comprising a modified synthetic resin characterized by the presence of a resinoid substance containing the reaction product of a substance containing the αβ-enal grouping

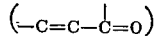

an unsaturated chemical body capable of forming an addition product with said substance, a chemical body containing resinophore groups capable of reacting with the reactive functional groups of said addition product, and a modifying agent characterized by its property of suitably modifying the properties of said resinoid.

18. A water-wettable, interfacial and surface-active reagent comprising an incompletely resinified compound characterized by the presence of an addition product of a substance containing the αβ-enal grouping

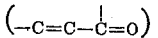

and an unsaturated chemical body having a system of conjugated double bonds.

19. A water-wettable, interfacial and surface-active reagent comprising a modified synthetic resin characterized by the presence of a resinoid substance containing the reaction product of a substance containing the αβ-enal grouping

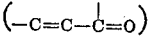

and an unsaturated chemical body having a system of conjugated double bonds and characterized by its property of forming addition products with substances containing the αβ-enal grouping

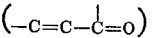

and a chemical body containing resinophore groups capable of reacting with the reactive functional groups of said addition product, and a modifying agent characterized by its property of suitably modifying the properties of said resinoid.

20. A water-wettable, interfacial and surface-active reagent comprising a compound characterized by the presence of an addition product of a substance containing the αβ-enal grouping

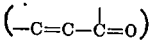

and an unsaturated chemical body, together with a modifying body capable of imparting fluidity, water-wettable, interfacial and surface-active properties.

21. A water-wettable, interfacial and surface-active active reagent comprising a compound characterized by the presence of an addition product of a substance containing the αβ-enal grouping

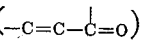

and an unsaturated chemical body and further characterized by the presence of one or more alkyl or cycloalkyl radicals having eight or more carbon atoms attached to the adduct residue.

22. A process for breaking a petroleum emulsion of the water-in-oil type which comprises subjecting the emulsion to the action of a demulsifying agent comprising a derivative of a Diels-Alder reaction product formed from a compound containing a carbon-carbon conjugated system and capable of reacting in a Diels-Alder synthesis and one containing a carbon-oxygen conjugated system.

23. A process, according to claim 22, in which the derivative is an ester.

24. A process, according to claim 22, in which the derivative is a polyhydric alcohol derivative.

25. A process for breaking a petroleum emulsion of the water-in-oil type which comprises subjecting the emulsion to the action of a demulsifying agent comprising a derivative of a Diels-Alder reaction product formed by reacting a diene hydrocarbon with a compound characterized by the fact that it contains in its structure the linkage —C=C—C=O.

26. A process, according to claim 25, in which the derivative is an ester.

TRUMAN B. WAYNE.